United States Patent Office 2,740,559
Patented Apr. 3, 1956

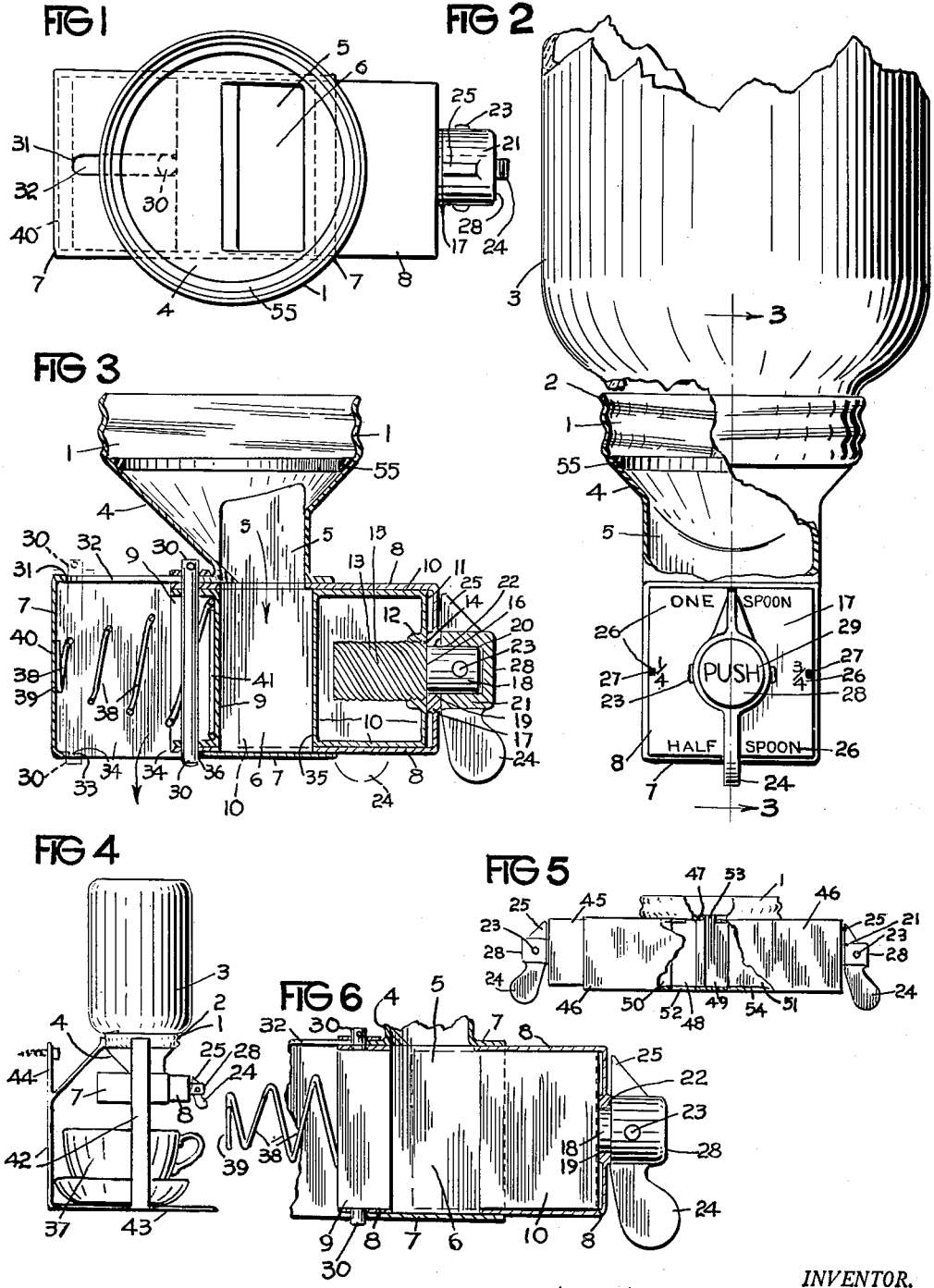

2,740,559

MEASURING DISPENSER

Nada J. Norwood, Jersey City, N. J.

Application May 6, 1952, Serial No. 286,297

10 Claims. (Cl. 222—308)

My invention relates to a measuring dispenser and particularly to a dispenser for powdered coffee, powdered or granulated sugar, and the like for table use, where the quantity is quickly and easily changed to suit the taste of the individual user.

Among the purposes and objects of my invention is to provide a table or kitchen utensil which is easily attached to replace the closure of cans, bottles, et cetera, and to suit numerous packages in which small quantities of the contents are easily delivered for use.

An object is to provide a substitute cover for a can or jar so that, for instance, a spoonful, three quarters, one half, one quarter, or other fraction of a unit of measurement may be instantly delivered to a cup or other vessel to suit the taste of the user at the moment.

Another object is to provide a push-button device which delivers exactly measured quantities, as immediately adjusted, of various table necessities, such as instant coffee, sugar, cocoa, et cetera.

Still another object is to provide a dispenser which is convenient, attractive, and instantly ready for use in delivering any predetermined measured quantity of various materials.

An object is to provide a combined closure and measuring dispenser.

An object is to provide a dispenser which is substantially air tight to prevent loss of flavor and which replaces the cover of containers for such materials as instant coffee, granulated sugar, cocoa, et cetera.

I accomplish these and other objects by the construction herein described and shown in the drawing which forms a part of this, my disclosure.

In the drawing:

Fig. 1 is a plan view.

Fig. 2 is a front elevational view.

Fig. 3 is a half section substantially along the vertical center line at 3—3, Fig. 2.

Fig. 4 is a side elevation showing one of the uses of my device.

Fig. 5 is an elevational view of a modification.

Fig. 6 is a fragmentary elevation showing the adjustable measuring member.

Similar reference characters refer to similar parts throughout the several views of the drawing and in the specifications.

Various devices for measuring quantities of liquid and other materials such as grain, coal, powders, and granulated commodities, have been used in industry and for dispensing some materials for household use. My dispenser, however, as may be seen by this disclosure, has structural advantages for dispensing an instantly adjusted quantity of the contents of packaged goods by replacing the cover of the package and at the same time sealing the contents from the outside air.

To illustrate one of its many uses, a jar of instant coffee after replacing its cover with my measuring dispenser may be passed around at the table to the individual users, each one of whom may desire a cup of coffee having a different strength, such as a fraction of a spoonful of the coffee. One may wish a full spoon of coffee per cup; others may wish a half spoonful, three quarters, one quarter of a spoonful per cup. Each user turns the pointer to the amount desired, pushes the button, and the exact amount of coffee is delivered to his cup.

The jar of coffee is always sealed from outside air until its contents are completely used. Another jar is at once made ready for use by replacing the cover with my instant dispenser which is thus used over and over again indefinitely, and always available.

The jar and dispenser may be supported on a stand or may be hung on the wall for some uses or, in its simplified form, may be held in the hand and inverted for use as desired.

I have not attempted to show all possible modifications of my invention, but rather have chosen to show and to describe in detail a preferred embodiment, so that one skilled in the art may more readily understand the construction and practice its use. Modifications may suggest themselves after a study of this disclosure.

The preciseness of the detailed description and the preciseness of the drawing are not intended to limit the scope of my invention which is set forth in the appended claims.

Referring to the drawing, I have shown the closure 1 as a threaded annulus 2 suitable to replace the threaded cover (not shown) of a typical jar or other package 3. Depending from the annulus 2, I have provided a somewhat conical hopper 4 so that the entire contents of the container will flow by gravity into and through the admissions port 5 to the measuring chamber 6, which is completely closed at the bottom by the housing 7 which is shown as substantially a hollow square joined at the top to the hopper 4 and connected through the port 5 to the jar above.

Within the housing 7 and slidably mounted therein, I have provided the conforming hollow sleeve 8 which is closed at one end by the removable head 9 and, at the opposite end, by the adjustable head 10 having an end wall 11 which is provided with the multiple pitch threaded boss 12, axially disposed to receive the conforming multiple pitch adjusting screw 13 for moving said head 10 within the conforming hollow sleeve 8 to vary the size of the chamber 6 to deliver a desired quantity, a measured quantity, from the jar above.

At the end 14 of the threads 15 of the screw 13, I have provided the shoulder 16 which engages the apertured end wall 17 of the sleeve 8. The spindle 18, integral with the screw 13, is rotatably mounted in the aperture 19 of the end wall 17 and extends beyond and out through said end wall to engage the bore 20 of the hub 21, the end 22 of which engages and cooperates with the shoulder 16 and the end wall to prevent axial movement of the screw 13 in relation to the sleeve 8. The screw thus when turned causes the head 10 to be moved within its conforming sleeve and to change the size of the chamber by changing the relative distance between the head 9 and the head 10.

The hub 21 is preferably secured to the spindle 18 by the pin 23 and is provided with a handle 24 for rotating the screw 13.

A pointer 25 is also provided on the hub 21 which cooperates with the indicia 26 on the outside of the end wall 17. The indicia 26 may be calibrated at 27 to show the capacity of the chamber 6, such as one spoonful, three quarters spoonful, one half spoonful, or one quarter spoonful.

The end of the hub 21 is closed to provide the push button 28 and is provided with the indicia 29 for designating "push" to suggest the manner of operation.

By pushing the button 28 the sleeve, with its filled chamber 6, is moved to the extreme travel where further movement is stopped by engagement of the pin 30 with the end 31 of the slot 32 at the top and the end 33 of the discharge port 34 at the bottom of the housing 7. The wall 35 of the chamber is moved to the end 36 of the discharge port, thus permitting the contents of the chamber to gravitate through the discharge port 34 into a cup or similar vessel 37.

The sleeve and its chamber are retracted for the next filling by the spring 38, the end 39 of which is seated against the end 40 of the housing and at its opposite end 41 against the head 9 of the sleeve.

It will be seen that the adjustable head is shown as positioned for the full capacity (one spoonful) in full lines; broken lines represent the minimum (one quarter spoonful). Any fraction of the maximum may be dispensed by adjusting the head 10 and chamber 6 by the handle and its screw. The calibration of the indicia may be any unit or fraction of quantity measurement, such as grams, ounces, pounds, et cetera.

In Fig. 4 I have shown my measuring dispenser as being provided with a supporting means comprising the legs 42 and stand 43 or a bracket lug 44 for securing my device to the wall when desired, for large sizes such as for kitchen use.

The legs may be attached to any stationary part of my device, such as the closure 1, the annulus 2, as shown.

In Fig. 5 I have shown a double acting device in which the sleeve 45 is slidably mounted in the housing 46 and is provided with a center partition 47 which separates two chambers 48 and 49, each adjusted by a movable adjustable head such as 50 and 51, each head 50 or 51 being preferably like the adjustable head 10. The screws, handles, push buttons may be similar to 13, 24, 28 respectively. The spring is not used for retracting the sleeve which is alternately movable from one extreme of travel to the other by alternately pushing the push button at one end of the device and then at the other, one discharge port 52 being in communication with the chamber 48 while the chamber 49 is in communication with the inlet port 53. When the sleeve is moved to the other extreme of travel, the chamber 49 is moved to communicate with the discharge port 54 and the chamber 48 is in communication with the inlet port 53.

The accuracy of fit, or tolerance between the moving parts may vary to suit the nature of the material to be dispensed, and the parts may be coated with flock or felt, and gaskets or packing 55 may be desirable in cases of some materials, such as liquids.

The size and materials of the various parts may vary to suit my measuring dispenser to the many uses for which it is adapted.

Having thus described a preferred embodiment of my invention, what I claim as new and desire to secure by letters patent is set forth in the following claims.

I claim:

1. A dispenser for packaged instant coffee and the like having a closure for replacing the cover of said package, a dispensing chamber movable in said closure, a hopper like connection to the dispensing chamber, a push button operator and spring retracting means, said push button having a handle and pointer for adjusting the size of the dispensing chamber and for indicating the amount delivered at each operation of the push button, said closure comprising a housing, a sleeve slidable therein operable by said push button, a movable head in said sleeve, and a screw secured to said handle for adjusting the size of the chamber by turning the handle.

2. A dispenser for packaged instant coffee and the like having a closure for replacing the cover of said package, a dispensing chamber movable in said closure, a hopper like connection to said dispensing chamber, a push button operator and spring retracting means, said push button having a handle and pointer for adjusting the size of said dispensing chamber and for indicating the amount delivered at each operation of the push button, said closure comprising a housing, a sleeve slidable therein operable by said push button, a movable head in said sleeve, and a screw secured to said handle for adjusting the size of the chamber by turning the handle, and packing means cooperating with said sleeve to seal said package when closed by said dispenser.

3. A measuring dispenser for replacing the closure of a container and for delivering various quantities of its contents, said dispenser comprising a spring retracted, rotatably mounted, indicating push button operating means, for dispensing and indicating the quantity being delivered, said dispenser having a measuring chamber, a hollow head movable to change the size of said measuring chamber, and a screw secured to said push button for moving said head, said screw being confined in said hollow head and having a pitch suitable for changing the various quantities from maximum to minimum within the limits of a single revolution of said screw.

4. A measuring dispenser for replacing the closure of a container and for delivering various quantities of its contents, said dispenser comprising a spring retracted, rotatably mounted, indicating push button operating means, for dispensing and indicating the quantity being delivered, said dispenser having a measuring chamber, a hollow head movable to change the size of said measuring chamber, and a screw secured to said push button for moving said head, said screw being confined in said hollow head and having a pitch suitable for changing the various quantities from maximum to minimum within the limits of a single revolution of said screw, said screw being suitable to adjust said measuring chamber to deliver one fourth its contents when rotated one forth of one revolution by said push button and to dispense said one forth of the contents of said chamber by pushing said push button.

5. A measuring dispenser for replacing the closure of a container and for delivering quantities of its contents, said dispenser comprising a spring retracted, rotatably mounted, indicating push button operating means, for dispensing and indicating the quantity being delivered, said dispenser having a measuring chamber, a hollow head movable to change the size of said measuring chamber, and a screw secured to said push button for moving said head, said screw being confined in said hollow head and having a pitch suitable for changing the various quantities from maximum to minimum within the limits of a single revolution of said screw, said hollow head having an end wall forming one of the walls of said measuring chamber to provide an unobstructed passage.

6. A measuring dispenser for replacing the closure of a container and for delivering various quantities of its contents, said dispenser comprising a spring retracted, rotatably mounted, indicating push button operating means, for dispensing and indicating the quantity being delivered, said dispenser having a measuring chamber, a hollow head movable to change the size of said measuring chamber, and a screw secured to said push button for moving said head, said screw being confined in said hollow head and having a pitch suitable for changing the various quantities from maximum to minimum within the limits of a single revolution of said screw, said hollow head having an end wall forming one of the walls of said measuring chamber to provide an unobstructed passage, and a handle and pointer secured to said push button and screw, operated by rotating said push button, and indicia on the outside of said dispenser movable with said push button and pointer and held in cooperative proximate relationship with said pointer to indicate the relative part of the revolution of said screw and the relative part of the contents being dispensed from said measuring chamber.

7. A measuring dispenser having a housing and closure for closing the container, the contents of which are being dispensed, a sleeve slidable within and to open and close said closure, a removable head closing one end of said sleeve, a movable head to provide a measuring chamber between the walls of said removable head and said movable head, and an adjusting screw within and confined to said movable head rotatable in the end wall of said sleeve, said sleeve having indicia on said end wall, a push button having a handle and pointer secured to said adjusting screw for pushing and sliding said sleeve and for rotating said adjusting screw, said indicia, pointer and the pitch of said adjusting screw cooperating to instantly deliver all or a part of the contents of said measuring chamber within one revolution, whereby the precise amount is at once indicated and dispensed by rotating and then pushing said push button.

8. A construction according to claim 7 wherein said housing is provided with a closed end wall, a spring, one end of which rests against said end wall and the opposite end against said removable head to move said sleeve in one direction, said spring being overcome by pressing said push button to move said sleeve in the opposite direction to discharge the contents of said measuring chamber.

9. A measuring dispenser for replacing the closure of a container and for delivering various quantities of its contents, said dispenser comprising rotatably mounted, indicating push button operating means, for dispensing and indicating the quantity being delivered, said dispenser having measuring chambers, hollow heads movable to change the size of said measuring chambers, and screws secured to said operating means for moving said heads, said screws being confined in said hollow heads and having a pitch suitable for changing the various quantities from maximum to minimum within the limits of a single revolution.

10. A construction according to claim 9 wherein said push button operating means comprises opposed push buttons, whereby one of said measuring chambers is discharged and the other measuring chamber filled when one button is pushed and the other measuring chamber discharged and the first measuring chamber filled when the other push button is pushed.

References Cited in the file of this patent

UNITED STATES PATENTS

| | | |
|---|---|---|
| 795,676 | Ammen | July 25, 1905 |
| 1,041,417 | Bohlig | Oct. 15, 1912 |
| 1,067,994 | Lundin | July 22, 1913 |
| 1,110,135 | Henderson | Sept. 8, 1914 |
| 1,516,942 | Wise | Nov. 25, 1924 |
| 2,081,544 | Krivig | May 25, 1937 |
| 2,282,110 | Angell | May 5, 1942 |